US008095796B2

(12) United States Patent
Conwell et al.

(10) Patent No.: US 8,095,796 B2
(45) Date of Patent: *Jan. 10, 2012

(54) CONTENT IDENTIFIERS

(75) Inventors: William Y. Conwell, Portland, OR (US); Brett A. Bradley, Portland, OR (US); Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 732 days.

This patent is subject to a terminal disclaimer.

(21) Appl. No.: 11/945,859

(22) Filed: Nov. 27, 2007

(65) Prior Publication Data
US 2008/0133556 A1    Jun. 5, 2008

Related U.S. Application Data

(63) Continuation-in-part of application No. 09/476,686, filed on Dec. 30, 1999, now Pat. No. 7,562,392, and a continuation-in-part of application No. 09/574,726, filed on May 18, 2000, and a continuation of application No. 09/888,339, filed on Jun. 21, 2001, now Pat. No. 7,302,574, which is a continuation-in-part of application No. 09/858,189, filed on May 14, 2001, now Pat. No. 7,185,201, which is a continuation-in-part of application No. 09/571,422, filed on May 15, 2000, now Pat. No. 6,947,571, which is a continuation-in-part of application No. 09/547,664, filed on Apr. 12, 2000, now Pat. No. 7,206,820, and a continuation-in-part of application No. 09/543,125, filed on Apr. 5, 2000, now Pat. No. 7,143,949, and a continuation-in-part of application No. 09/552,998, filed on Apr. 19, 2000, now abandoned, and a continuation-in-part of application No. 09/531,076, filed on Mar. 18, 2000, and a continuation-in-part of application No. 09/342,689, filed on Jun. 29, 1999, now Pat. No. 6,311,214, and a continuation-in-part of application No. 09/343,104, filed on Jun. 29, 1999, now abandoned, and a continuation-in-part of application No. 09/314,648, filed on May 19, 1999, now Pat. No. 6,681,028, and a continuation-in-part of application No. 09/343,101, filed on Jun. 29, 1999, now abandoned, and a continuation-in-part of application No. 09/342,971, filed on Jun. 29, 1999, now abandoned, and a continuation-in-part of application No. 09/342,688, filed on Jun. 29, 1999, now Pat. No. 6,650,761.

(60) Provisional application No. 60/134,782, filed on May 19, 1999, provisional application No. 60/141,468, filed on Jun. 29, 1999, provisional application No. 60/151,586, filed on Aug. 30, 1999, provisional application No. 60/158,015, filed on Oct. 6, 1999, provisional application No. 60/163,332, filed on Nov. 3, 1999, provisional application No. 60/164,619, filed on Nov. 10, 1999.

(51) Int. Cl.
*H04L 9/00* (2006.01)

(52) U.S. Cl. ............................ 713/176; 713/161; 726/26

(58) Field of Classification Search .......... 380/200–204, 380/54; 713/161, 176; 726/27, 30–32, 26; 705/57–59; 382/100, 115–119, 124; 381/115–119
See application file for complete search history.

(56) References Cited

U.S. PATENT DOCUMENTS

| | | |
|---|---|---|
| 3,810,156 A | 5/1974 | Goldman |
| 3,919,479 A | 11/1975 | Moon et al. |
| 4,071,698 A | 1/1978 | Barger, Jr. et al. |
| 4,230,990 A | 10/1980 | Lert, Jr. et al. |
| 4,284,846 A | 8/1981 | Marley |
| 4,432,096 A | 2/1984 | Bunge |
| 4,450,531 A | 5/1984 | Kenyon et al. |
| 4,495,526 A | 1/1985 | Baranoff-Rossine |
| 4,499,601 A | 2/1985 | Matthews |
| 4,511,917 A | 4/1985 | Kohler et al. |
| 4,547,804 A | 10/1985 | Greenberg |
| 4,677,466 A | 6/1987 | Lert, Jr. et al. |
| 4,682,370 A | 7/1987 | Matthews |
| 4,697,209 A | 9/1987 | Kiewit et al. |
| 4,739,398 A | 4/1988 | Thomas et al. |
| 4,776,017 A | 10/1988 | Fujimoto |
| 4,843,562 A | 6/1989 | Kenyon et al. |
| 4,931,871 A | 6/1990 | Kramer |
| 4,945,412 A | 7/1990 | Kramer |
| 5,019,899 A | 5/1991 | Boles et al. |
| 5,276,629 A | 1/1994 | Reynolds |

(Continued)

FOREIGN PATENT DOCUMENTS

EP    161512    11/1985

(Continued)

OTHER PUBLICATIONS

U.S. Appl. No. 09/337,590, filed Jun. 21, 1999, Geoffrey B. Rhoads.

(Continued)

*Primary Examiner* — Hosuk Song

(57) ABSTRACT

The present disclosure relates generally to content identification with so-called fingerprinting. One claim recites a method comprising: deriving fingerprint information corresponding to audio or video using a mobile user device; obtaining geographical location information associated with the mobile user device; communicating the fingerprint information and the geographical location information to a remotely located network service; and receiving a response from the remotely located service, the response being dependent on both the fingerprint information and the geographical location information. Of course, other claims and combinations are provided.

38 Claims, No Drawings

U.S. PATENT DOCUMENTS

| | | | |
|---|---|---|---|
| 5,303,393 A | 4/1994 | Noreen et al. | |
| 5,329,108 A | 7/1994 | Lamoure | |
| 5,385,371 A | 1/1995 | Izawa | |
| 5,400,261 A | 3/1995 | Reynolds | |
| 5,436,653 A | 7/1995 | Ellis et al. | |
| 5,437,050 A | 7/1995 | Lamb et al. | |
| 5,481,294 A | 1/1996 | Thomas et al. | |
| 5,486,686 A | 1/1996 | Zdybel, Jr. et al. | |
| 5,504,518 A | 4/1996 | Ellis et al. | |
| 5,539,635 A | 7/1996 | Larson, Jr. | |
| 5,564,073 A | 10/1996 | Takahisa | |
| 5,572,246 A | 11/1996 | Ellis et al. | |
| 5,572,653 A | 11/1996 | DeTemple et al. | |
| 5,574,519 A | 11/1996 | Manico et al. | |
| 5,574,962 A | 11/1996 | Fardeau et al. | |
| 5,577,249 A | 11/1996 | Califano | |
| 5,577,266 A | 11/1996 | Takahisa et al. | |
| 5,579,124 A | 11/1996 | Aijala et al. | |
| 5,581,658 A | 12/1996 | O'Hagan et al. | |
| 5,581,800 A | 12/1996 | Fardeau et al. | |
| 5,584,070 A | 12/1996 | Harris et al. | |
| 5,612,729 A | 3/1997 | Ellis et al. | |
| 5,621,454 A | 4/1997 | Ellis et al. | |
| 5,640,193 A | 6/1997 | Wellner | |
| 5,661,787 A | 8/1997 | Pocock | |
| 5,671,267 A | 9/1997 | August et al. | |
| 5,708,478 A | 1/1998 | Tognazzini | |
| 5,715,518 A * | 2/1998 | Barrere et al. | 340/5.8 |
| 5,761,606 A | 6/1998 | Wolzien | |
| 5,765,152 A | 6/1998 | Erickson | |
| 5,765,176 A | 6/1998 | Bloomberg | |
| 5,768,426 A | 6/1998 | Rhoads | |
| 5,774,452 A | 6/1998 | Wolosewicz | |
| 5,778,192 A | 7/1998 | Schuster et al. | |
| 5,781,914 A | 7/1998 | Stork et al. | |
| 5,832,119 A | 11/1998 | Rhoads | |
| 5,841,978 A | 11/1998 | Rhoads | |
| 5,862,260 A | 1/1999 | Rhoads | |
| 5,889,868 A | 3/1999 | Moskowitz et al. | |
| 5,892,900 A | 4/1999 | Ginter et al. | |
| 5,893,095 A | 4/1999 | Jain et al. | |
| 5,901,224 A | 5/1999 | Hecht | |
| 5,902,353 A | 5/1999 | Reber et al. | |
| 5,903,892 A | 5/1999 | Hoffert et al. | |
| 5,905,248 A | 5/1999 | Russell et al. | |
| 5,905,800 A | 5/1999 | Moskowitz et al. | |
| 5,918,223 A | 6/1999 | Blum et al. | |
| 5,930,369 A | 7/1999 | Cox et al. | |
| 5,938,727 A | 8/1999 | Ikeda | |
| 5,940,135 A | 8/1999 | Petrovic et al. | |
| 5,943,422 A | 8/1999 | Van Wie et al. | |
| 5,960,101 A * | 9/1999 | Lo et al. | 382/125 |
| 5,982,956 A | 11/1999 | Lahmi | |
| 5,983,176 A | 11/1999 | Hoffert et al. | |
| 5,986,651 A | 11/1999 | Reber et al. | |
| 5,986,692 A | 11/1999 | Logan et al. | |
| 5,991,737 A | 11/1999 | Chen | |
| 5,995,105 A | 11/1999 | Reber et al. | |
| 6,005,501 A | 12/1999 | Wolosewicz | |
| 6,021,315 A * | 2/2000 | Telewski | 455/67.11 |
| 6,028,960 A | 2/2000 | Graf et al. | |
| 6,061,793 A | 5/2000 | Tewfik | |
| 6,081,827 A | 6/2000 | Reber et al. | |
| 6,081,830 A | 6/2000 | Schindler | |
| 6,084,528 A | 7/2000 | Beach et al. | |
| 6,088,455 A | 7/2000 | Logan et al. | |
| 6,121,530 A | 9/2000 | Sonoda | |
| 6,122,403 A | 9/2000 | Rhoads | |
| 6,138,151 A | 10/2000 | Reber et al. | |
| 6,141,436 A * | 10/2000 | Srey et al. | 382/124 |
| 6,164,534 A | 12/2000 | Rathus et al. | |
| 6,169,541 B1 | 1/2001 | Smith | |
| 6,199,048 B1 | 3/2001 | Hudetz et al. | |
| 6,199,076 B1 | 3/2001 | Logan | |
| 6,201,879 B1 | 3/2001 | Bender et al. | |
| 6,219,787 B1 | 4/2001 | Brewer | |
| 6,282,362 B1 | 8/2001 | Murphy et al. | |
| 6,286,036 B1 | 9/2001 | Rhoads | |
| 6,311,214 B1 | 10/2001 | Rhoads | |
| 6,314,457 B1 | 11/2001 | Schena et al. | |
| 6,321,992 B1 | 11/2001 | Knowles et al. | |
| 6,324,573 B1 | 11/2001 | Rhoads | |
| 6,345,104 B1 | 2/2002 | Rhoads | |
| 6,386,453 B1 | 5/2002 | Russell et al. | |
| 6,389,055 B1 | 5/2002 | August et al. | |
| 6,408,331 B1 | 6/2002 | Rhoads | |
| 6,411,725 B1 | 6/2002 | Rhoads | |
| 6,434,561 B1 | 8/2002 | Durst, Jr. et al. | |
| 6,439,465 B1 | 8/2002 | Bloomberg | |
| 6,442,285 B2 | 8/2002 | Rhoads et al. | |
| 6,496,802 B1 | 12/2002 | van Zoest et al. | |
| 6,504,493 B1 | 1/2003 | Burd | |
| 6,504,571 B1 | 1/2003 | Narayanaswami et al. | |
| 6,505,160 B1 | 1/2003 | Levy et al. | |
| 6,522,769 B1 | 2/2003 | Rhoads et al. | |
| 6,526,449 B1 | 2/2003 | Philyaw et al. | |
| 6,542,927 B2 | 4/2003 | Rhoads | |
| 6,542,933 B1 | 4/2003 | Durst, Jr. et al. | |
| 6,553,129 B1 | 4/2003 | Rhoads | |
| 6,577,746 B1 | 6/2003 | Evans et al. | |
| 6,614,914 B1 | 9/2003 | Rhoads | |
| 6,650,761 B1 | 11/2003 | Rodriguez et al. | |
| 6,674,876 B1 | 1/2004 | Hannigan et al. | |
| 6,681,028 B2 | 1/2004 | Rodriguez et al. | |
| 6,697,948 B1 * | 2/2004 | Rabin et al. | 726/30 |
| 6,782,191 B1 | 8/2004 | Mohammed et al. | |
| 6,785,815 B1 | 8/2004 | Serret-Avila et al. | |
| 6,804,376 B2 | 10/2004 | Rhoads et al. | |
| 6,807,534 B1 | 10/2004 | Erickson | |
| 6,816,596 B1 | 11/2004 | Peinado et al. | |
| 6,829,368 B2 | 12/2004 | Meyer et al. | |
| 6,834,308 B1 | 12/2004 | Ikezoye et al. | |
| 6,850,626 B2 | 2/2005 | Rhoads et al. | |
| 6,898,706 B1 | 5/2005 | Venkatesan et al. | |
| 6,931,451 B1 | 8/2005 | Logan et al. | |
| 6,941,275 B1 | 9/2005 | Swierczek | |
| 6,947,571 B1 | 9/2005 | Rhoads et al. | |
| 6,954,856 B1 | 10/2005 | Kohashi et al. | |
| 6,965,682 B1 | 11/2005 | Davis et al. | |
| 6,970,886 B1 | 11/2005 | Conwell et al. | |
| 6,973,669 B2 | 12/2005 | Daniels | |
| 7,020,304 B2 | 3/2006 | Alattar et al. | |
| 7,055,034 B1 | 5/2006 | Levy | |
| 7,143,949 B1 | 12/2006 | Hannigan | |
| 7,149,722 B1 | 12/2006 | Abburi | |
| 7,171,018 B2 | 1/2007 | Rhoads et al. | |
| 7,185,201 B2 | 2/2007 | Rhoads et al. | |
| 7,206,820 B1 | 4/2007 | Rhoads | |
| 7,224,995 B2 | 5/2007 | Rhoads | |
| 7,249,257 B2 | 7/2007 | Brundage et al. | |
| 7,289,643 B2 | 10/2007 | Brunk et al. | |
| 7,302,574 B2 * | 11/2007 | Conwell et al. | 713/176 |
| 7,333,957 B2 | 2/2008 | Levy et al. | |
| 7,349,552 B2 | 3/2008 | Levy et al. | |
| 7,415,129 B2 | 8/2008 | Rhoads | |
| 7,426,750 B2 | 9/2008 | Cooper et al. | |
| 7,461,136 B2 | 12/2008 | Rhoads | |
| 7,486,827 B2 | 2/2009 | Kim | |
| 7,505,605 B2 | 3/2009 | Rhoads et al. | |
| 7,545,951 B2 | 6/2009 | Davis et al. | |
| 7,562,392 B1 | 7/2009 | Rhoads et al. | |
| 7,564,992 B2 | 7/2009 | Rhoads | |
| 7,565,294 B2 | 7/2009 | Rhoads | |
| 7,587,602 B2 | 9/2009 | Rhoads | |
| 7,590,259 B2 | 9/2009 | Levy et al. | |
| 7,593,576 B2 | 9/2009 | Meyer et al. | |
| 7,606,390 B2 | 10/2009 | Rhoads | |
| 7,650,010 B2 | 1/2010 | Levy et al. | |
| 7,689,532 B1 | 3/2010 | Levy | |
| 7,693,965 B2 | 4/2010 | Rhoads | |
| 7,711,564 B2 | 5/2010 | Levy et al. | |
| 7,715,446 B2 | 5/2010 | Rhoads | |
| 7,751,596 B2 | 7/2010 | Rhoads | |
| 7,760,905 B2 | 7/2010 | Rhoads et al. | |
| 7,805,500 B2 | 9/2010 | Rhoads | |
| 7,840,005 B2 | 11/2010 | Delp et al. | |
| 7,930,546 B2 | 4/2011 | Rhoads et al. | |

| | | |
|---|---|---|
| 7,936,900 B2 | 5/2011 | Rhoads et al. |
| 7,945,070 B2 | 5/2011 | Andrews, III et al. |
| 7,949,149 B2 | 5/2011 | Rhoads et al. |
| 7,953,270 B2 | 5/2011 | Rhoads |
| 7,961,949 B2 | 6/2011 | Levy et al. |
| 7,965,864 B2 | 6/2011 | Davis et al. |
| 7,966,494 B2 | 6/2011 | Rhoads |
| 2001/0026618 A1 | 10/2001 | Van Wie et al. |
| 2001/0026629 A1 | 10/2001 | Oki |
| 2001/0031066 A1 | 10/2001 | Meyer et al. |
| 2001/0032312 A1 | 10/2001 | Runje et al. |
| 2001/0044744 A1 | 11/2001 | Rhoads |
| 2001/0044824 A1 | 11/2001 | Hunter et al. |
| 2001/0053234 A1 | 12/2001 | Rhoads |
| 2001/0055391 A1 | 12/2001 | Jacobs |
| 2002/0010826 A1 | 1/2002 | Takahashi et al. |
| 2002/0021805 A1 | 2/2002 | Schumann et al. |
| 2002/0021822 A1 | 2/2002 | Maeno |
| 2002/0023020 A1 | 2/2002 | Kenyon et al. |
| 2002/0023148 A1 | 2/2002 | Ritz et al. |
| 2002/0023218 A1 | 2/2002 | Lawandy et al. |
| 2002/0032698 A1 | 3/2002 | Cox |
| 2002/0040433 A1 | 4/2002 | Kondo |
| 2002/0044659 A1 | 4/2002 | Ohta et al. |
| 2002/0052885 A1 | 5/2002 | Levy |
| 2002/0059580 A1 | 5/2002 | Kalker et al. |
| 2002/0072989 A1 | 6/2002 | Van De Sluis |
| 2002/0075298 A1 | 6/2002 | Schena et al. |
| 2002/0082997 A1 | 6/2002 | Kobata et al. |
| 2002/0083123 A1 | 6/2002 | Freedman et al. |
| 2002/0102966 A1 | 8/2002 | Lev et al. |
| 2002/0126872 A1 | 9/2002 | Brunk |
| 2002/0133499 A1 | 9/2002 | Ward et al. |
| 2002/0150165 A1 | 10/2002 | Huizer |
| 2002/0152388 A1 | 10/2002 | Linnartz et al. |
| 2002/0161741 A1 | 10/2002 | Wang et al. |
| 2002/0178410 A1 | 11/2002 | Haitsma et al. |
| 2003/0028488 A1 | 2/2003 | Mohammed et al. |
| 2003/0040957 A1 | 2/2003 | Rodriguez et al. |
| 2003/0167173 A1 | 9/2003 | Levy et al. |
| 2003/0174861 A1 | 9/2003 | Levy et al. |
| 2005/0044189 A1 | 2/2005 | Ikezoye et al. |
| 2005/0091268 A1 | 4/2005 | Meyer et al. |
| 2007/0100757 A1 | 5/2007 | Rhoads |
| 2007/0185840 A1 | 8/2007 | Rhoads |
| 2007/0195987 A1 | 8/2007 | Rhoads |
| 2007/0250194 A1 | 10/2007 | Rhoads et al. |
| 2007/0250716 A1 | 10/2007 | Rhoads et al. |
| 2007/0253594 A1 | 11/2007 | Lu et al. |
| 2008/0133416 A1 | 6/2008 | Rhoads |
| 2008/0140433 A1 | 6/2008 | Levy et al. |
| 2008/0140573 A1 | 6/2008 | Levy et al. |
| 2008/0317278 A1 | 12/2008 | Lefebvre et al. |
| 2008/0319859 A1 | 12/2008 | Rhoads |
| 2009/0177742 A1 | 7/2009 | Rhoads et al. |
| 2009/0290754 A1 | 11/2009 | Rhoads |
| 2010/0008586 A1 | 1/2010 | Meyer et al. |
| 2010/0009722 A1 | 1/2010 | Levy et al. |
| 2010/0036881 A1 | 2/2010 | Rhoads et al. |
| 2010/0046744 A1 | 2/2010 | Rhoads et al. |
| 2010/0138012 A1 | 6/2010 | Rhoads |
| 2010/0185306 A1 | 7/2010 | Rhoads |
| 2010/0322035 A1 | 12/2010 | Rhoads et al. |

FOREIGN PATENT DOCUMENTS

| | | |
|---|---|---|
| EP | 493091 | 7/1992 |
| EP | 953938 | 11/1999 |
| EP | 967803 | 12/1999 |
| EP | 1173001 | 1/2002 |
| JP | 11265396 | 9/1999 |
| WO | WO98/03923 | 1/1998 |
| WO | WO99/35809 | 7/1999 |
| WO | WO00/58940 | 10/2000 |
| WO | WO01/15021 | 3/2001 |
| WO | WO01/20483 | 3/2001 |
| WO | WO01/20609 | 3/2001 |
| WO | WO01/62004 | 8/2001 |
| WO | WO01/71517 | 9/2001 |
| WO | WO01/72030 | 9/2001 |
| WO | WO01/75629 | 10/2001 |
| WO | WO02/11123 | 2/2002 |
| WO | WO02/19589 | 3/2002 |
| WO | WO02/27600 | 4/2002 |

OTHER PUBLICATIONS

U.S. Appl. No. 09/515,826, filed Feb. 29, 2000, Geoffrey B. Rhoads.
U.S. Appl. No. 09/491,534, filed Jan. 26, 2000, Bruce L. Davis, et al.
U.S. Appl. No. 09/574726, filed May 18, 2000, Geoffrey B. Rhoads.
Cano et al., "A Review of Audio Fingerprinting," Journal of VLSI Signal Processing, 41, 271-284, 2005.
Mar. 29, 2011 Amendment; Jan. 5, 2011 Notice of Allowance; Dec. 17, 2010 Amendment after Final; Oct. 25, 2010 Final Rejection; Aug. 6, 2010 Amendment; all from assignee's U.S. Appl. No. 11/865,557 (published as US 2008-0140433 A1).
U.S. Appl. No. 60/141,468, filed Jun. 29, 1999, Livermore.
U.S. Appl. No. 60/151,586, filed Aug. 30, 1999, Rodriguez.
U.S. Appl. No. 60/158,015, filed Oct. 6, 1999, Davis et al.
U.S. Appl. No. 60/163,332, filed Nov. 3, 1999, Rhoads.
U.S. Appl. No. 60/164,619, filed Nov. 10, 1999, Rhoads et al.
U.S. Appl. No. 60/134,782, filed May 19, 1999, Rhoads et al.
U.S. Appl. No. 60/232,163, filed Sep. 11, 2000, Levy et al.
U.S. Appl. No. 60/232,618, filed Sep. 14, 2000, Cox.
U.S. Appl. No. 60/257,822, filed Dec. 21, 2000, Aggson et al.
U.S. Appl. No. 60/263,490, filed Jan. 22, 2001, Brunk et al.
U.S. Appl. No. 60/175,159, filed Jan. 7, 2000, Derose et al.
U.S. Appl. No. 60/178,028, filed Jan. 26, 2000, Meyer et al.
U.S. Appl. No. 09/343,101, filed Jun. 29, 1999, Davis et al.
U.S. Appl. No. 09/343,104, filed Jun. 29, 1999, Rodriguez et al.
U.S. Appl. No. 09/531,076, filed Mar. 18, 2000, Rhoads et al.
U.S. Appl. No. 09/552,998, filed Apr. 19, 2000, Rodriguez et al.
U.S. Appl. No. 09/574,726, filed May 18, 2000, Rhoads.
Lee, "Fingerprinting," Chapter 8 in Information Hiding Techniques for Steganography and Digital Watermarking, Boston, MA, Artech House, pp. 175-190, 2000.
Lee, *Information Hiding: Techniques for Steganography and Digital Watermarking* edited by Stefan Katzenbeisse and Fabien A.P. Petitcolas, published by Artech House, 1999.
Lin, et al., "Generating Robust Digital Signature for Image/Video Authentication," Proc. Multimedia and Security workshop at ACM Multimedia'98, Sep. 1, 1998, pp. 49-54.
Ghias et al, Query by Humming: Musical Information Retrieval in an Audio Database, In ACM Multimedia, pp. 231-236, Nov. 1995.
Kageyama et al, Melody Retrieval with Humming, Proceedings of Int. Computer Music Conference (ICMC), 1993.
Muscle Fish press release, Muscle Fish's Audio Search Technology to be Encapsulated into Informix Datablade Module, Jul. 10, 1996.
Wagner, "Fingerprinting," IEEE Proc. Symp. on Security and Privacy, pp. 18-22 (1983).
Wold et al, Content-Based Classification, Search, and Retrieval of Audio, IEEE Multimedia Magazine, Fall, 1996.
Mar. 12, 2010 non-final Office Action; Jan. 28, 2010 Amendment; Jan. 27, 2010 non-final Office Action; all from assignee's U.S. Appl. No. 11/865,557 (published as US 2008-0140433 A1).

* cited by examiner

CONTENT IDENTIFIERS

RELATED APPLICATION DATA

This application is a continuation of U.S. patent application Ser. No. 09/888,339, filed Jun. 21, 2001 (now U.S. Pat. No. 7,302,574), which is a continuation-in-part of U.S. patent application Ser. No. 09/858,189, filed May 14, 2001 (now U.S. Pat. No. 7,185,201), which is a continuation in part of U.S. patent application Ser. No. 09/571,422, filed May 15, 2000 (now U.S. Pat. No. 6,947,571), which is a continuation-in-part of U.S. patent application Ser. No. 09/314,648, filed May 19, 1999 (now U.S. Pat. No. 6,681,028), Ser. No. 09/342,688, filed Jun. 29, 1999 (now U.S. Pat. No. 6,650,761), Ser. No. 09/342,689, filed Jun. 29, 1999 (now U.S. Pat. No. 6,311,214), Ser. No. 09/342,971, filed Jun. 29, 1999 (published as US 2003-0040957 A1), Ser. No. 09/343,101, filed on Jun. 29, 1999 (abandoned), Ser. No. 09/343,104, filed on Jun. 29, 1999 (abandoned), Ser. No. 09/531,076 filed on Mar. 18, 2000, Ser. No. 09/543,125, filed on Apr. 5, 2000 (now U.S. Pat. No. 7,143,949), Ser. No. 09/547,664, filed on Apr. 12, 2000 (now U.S. Pat. No. 7,206,820), and Ser. No. 09/552,998, filed on Apr. 19, 2000 (abandoned), U.S. patent application Ser. No. 09/571,422 also claims the benefit of Provisional Application Nos. 60/141,468 filed on Jun. 29, 1999, 60/151,586 filed on Aug. 30, 1999, 60/158,015 filed on Oct. 6, 1999. 60/163,332 filed on Nov. 3, 1999, and 60/164,619 filed on Nov. 10, 1999.

This application is also a continuation-in-part of U.S. patent application Ser. Nos. 09/574,726, filed on May 18, 2000 and 09/476,686, filed on Dec. 30, 1999 (now U.S. Pat. No. 7,562,392), both of which claim the benefit of Provisional Application 60/134,782, filed May 19, 1999.

The present application claims priority benefit to the foregoing applications.

The subject matter of this application is also related to that of Ser. No. 09/620,019 (U.S. Pat. No. 7,689,532), 60/257,822, 60/232,163, and Ser. No. 09/404,291 (now U.S. Pat. No. 7,055,034).

FIELD OF THE INVENTION

The present invention relates to computer-based systems, and more particularly relates to systems that identify electronic or physical objects (e.g., audio, printed documents, video, etc.), and trigger corresponding responses.

BACKGROUND

In application Ser. No. 09/571,422 (now laid-open as PCT publication WO 00/70585, and issued as U.S. Pat. No. 6,947,571), the present assignee described technology that can sense an object identifier from a physical or electronic object, and trigger a corresponding computer response.

In application Ser. Nos. 09/574,726 and 09/476,686, the present assignee described technology that uses a microphone to sense audio sounds, determine an identifier corresponding to the audio, and then trigger a corresponding response.

DETAILED DESCRIPTION

Although the cited patent applications focused on use of digital watermarks to identify the subject objects/audio, they noted that the same applications and benefits can be provided with other identification technologies.

One such suitable technology—variously known as robust hashing, fingerprinting, etc.—involves generating an identifier from attributes of the content. This identifier can then be looked-up in a database (or other data structure) to determine the song (or other audio track) to which it corresponds.

Various fingerprinting technologies are known. For example, a software program called TRM, from Relatable Software, was written up in the Washington Post as follows:

> TRM performs a small technological miracle: It "fingerprints" songs, analyzing beat and tempo to generate a unique digital identifier. Since every song is slightly different, no two "acoustic fingerprints" are alike, not even live and studio versions of the same melody.

Tuneprint is another such audio fingerprinting tool. Tuneprint is understood to utilize a model of human hearing used to predict how audio will appear after it's been distorted by the human ear, and the parts of neural processing that are understood. This is some of the same information that led to MP3 encoders achieving exceptional audio compression. Characteristics that uniquely identify the track are then identified by picking out the most important, surprising, or significant features of the sound.

Yet another fingerprinting program is Songprint, available as an open source library from freetantrum.org.

Still other fingerprinting technologies are available from Cantametrix (see, e.g., published patent applications WO01/20483 and WO01/20609).

One particular approach to fingerprinting is detailed in the present assignee's application 60/263,490, filed Jan. 22, 2001.

One form of fingerprint may be derived by applying content—in whole or part, and represented in time- or frequency format—to a neural network, such as a Kohonen self-organizing map. For example, a song may be identified by feeding the first 30 seconds of audio, with 20 millisecond Fourier transformed windows, into a Kohonen network having 64 outputs. The 64 outputs can, themselves, form the fingerprint, or they can be further processed to yield the fingerprint.

A variety of other fingerprinting tools and techniques are known to artisans in the field. Others are disclosed, e.g., in applications 60/257,822, Ser. No. 09/563,664 (U.S. Pat. No. 6,505,160), and Ser. No. 09/578,551 (U.S. Pat. No. 6,970,886). See also the chapter on Fingerprinting by John Hyeon Lee, in *Information Hiding: Techniques for Steganography and Digital Watermarking* edited by Stefan Katzenbeisse and Fabien A. P. Petitcolas, published by Artech House.

One way to generate a fingerprint is to "hash" the audio, to derive a shorter code that is dependent, in a predetermined way, on the audio data. However, slight differences in the audio data (such as sampling rate) can cause two versions of the same song to yield two different hash codes. While this outcome is advantageous in certain outcomes, it is disadvantageous in many others.

Generally preferable are audio fingerprinting techniques that yield the same fingerprints, even if the audio data are slightly different. Thus, a song sampled at a 96K bit rate desirably should yield the same fingerprint as the same song sampled at 128K. Likewise, a song embedded with steganographic watermark data should generally yield the same fingerprint as the same song without embedded watermark data.

One way to do this is to employ a hash function that is insensitive to certain changes in the input data. Thus, two audio tracks that are acoustically similar will hash to the same code, notwithstanding the fact that individual bits are different. A variety of such hashing techniques are known.

Another approach does not rely on "hashing" of the audio data bits. Instead, the audio is decomposed into elements having greater or lesser perceptibility. Audio compression techniques employ such decomposition methods, and discard the elements that are essentially imperceptible. In fingerprinting, these elements can also be disregarded, and the "fingerprint" taken from the acoustically significant portions of the audio (e.g., the most significant coefficients after transformation of the audio into a transform domain, such as DCT).

Some fingerprinting techniques do not rely on the absolute audio data (or transformed data) per se, but rather rely on the changes in such data from sample to sample (or coefficient to coefficient) as an identifying hallmark of the audio.

Some fingerprinting algorithms consider the entire audio track (e.g., 3 minutes). Others work on much shorter windows—a few seconds, or fractions of seconds. The former technique yields a single fingerprint for the track. The latter yields plural fingerprints—one from each excerpt. (The latter fingerprints can be concatenated, or otherwise combined, to yield a master fingerprint for the entire audio track.) For compressed audio, one convenient unit from which excerpts can be formed is the frame or window used in the compression algorithm (e.g., the excerpt can be one frame, five frames, etc.).

One advantage to the excerpt-based techniques is that a song can be correctly identified even if it is truncated. Moreover, the technique is well suited for use with streaming media (in which the entire song data is typically not available all at once as a single file).

In database look-up systems employing fingerprints from short excerpts, a first fingerprint may be found to match 10 songs. To resolve this ambiguity, subsequent excerpt-fingerprints can be checked.

One way of making fingerprints "robust" against variations among similar tracks is to employ probabilistic methods using excerpt-based fingerprints. Consider the following, over-simplified, example:

| Fingerprinted excerpt | Matches these songs in database |
|---|---|
| Fingerprint 1 | A, B, C |
| Fingerprint 2 | C, D, E |
| Fingerprint 3 | B, D, F |
| Fingerprint 4 | B, F, G |

This yields a "vote" tally as follows:

| | Matches to | | | | | | |
|---|---|---|---|---|---|---|---|
| | A | B | C | D | E | F | G |
| # Hits | 1 | 3 | 2 | 2 | 1 | 2 | 1 |

In this situation, it appears most probable that the fingerprints correspond to song B, since three of the four excerpt-fingerprints support such a conclusion. (Note that one of the excerpts—that which yielded Fingerprint 2—does not match song B at all.)

More sophisticated probabilistic techniques, of course, can be used.

Once a song has been identified in a database, a number of different responses can be triggered. One is to impose a set of usage controls corresponding to terms set by the copyright holder (e.g., play control limitations, record control, fee charges, etc.) Another is to identify metadata related to the song, and provide the metadata to a user (or a link to the metadata). In some such applications, the song is simply identified by title and artist, and this information is returned to the user, e.g., by email, instant messaging, etc. With this information, the user can be given an option to purchase the music in CD or electronic form, purchase related materials (t-shirts, concert tickets), etc. A great variety of other content-triggered actions are disclosed in the cited applications.

One of the advantages of fingerprint-based content identification systems is that they do not require any alteration to the content. Thus, recordings made 50 years ago can be fingerprinted, and identified through such techniques.

Going forward, there are various advantages to encoding the content with the fingerprint. Thus, for example, a fingerprint identifier derived from a song can be stored in a file header of a file containing that song. (MP3 files, MPEG files, and most other common content file formats include header fields in which such information can readily be stored.) The fingerprint can then obtained in two different ways—by reading the header info, and by computation from the audio information. This redundancy offers several advantages. One aids security. If a file has a header-stored fingerprint that does not match a fingerprint derived from the file contents, something is amiss—the file may be destructive (e.g., a bomb or virus), or the file structure may misidentify the file contents.

In some embodiments, the fingerprint data (or watermark data) stored in the header may be encrypted, and/or authenticated by a digital signature such as a complete hash, or a few check bits or CRC bits. In such cases, the header data can be the primary source of the fingerprint (watermark) information, with the file contents being processed to re-derive the fingerprint (watermark) only if authentication of the fingerprint stored in the header fails. Instead of including the fingerprint in the header, the header can include an electronic address or pointer data indicating another location (e.g., a URL or database record) at which the fingerprint data is stored. Again, this information may be secured using known techniques.

Similarly, the fingerprint can point to a database that contains one or more IDs that are added via a watermark. This is useful when CDs are being converted to MP3 files (i.e. ripped) and the fingerprint is calculated from a hash of the table of contents (TOC) such as done with CDDB.com, or from all of the songs. In this case, the database entry for that fingerprint could include a list of IDs for each song, and these IDs are added via a watermark and/or frame header data. This can also be useful where the content is identified based upon a group of fingerprints from plural excerpts, in which case the database that determines the content also contains an identifier, unrelated to the fingerprint(s) for that piece of content that can be embedded via a watermark.

Instead of, or in addition to, storing a fingerprint in a file header, the fingerprint data may be steganographically encoded into the file contents itself, using known watermarking techniques (e.g., those disclosed in application Ser. No. 09/503,881 (U.S. Pat. No. 6,614,914), and U.S. Pat. Nos. 6,061,793, 6,005,501 and 5,940,135). For example, the fingerprint ID can be duplicated in the data embedded via a watermark.

In some arrangements, a watermark can convey a fingerprint, and auxiliary data as well. The file header can also convey the fingerprint, and the auxiliary data. And even if the file contents are separated from the header, and the watermark is corrupted or otherwise lost, the fingerprint can still be recovered from the content. In some cases, the lost auxiliary data can alternatively be obtained from information in a database record identified by the fingerprint (e.g., the auxiliary information can be literally stored in the record, or the record can point to another source where the information is stored).

Instead of especially processing a content file for the purpose of encoding fingerprint data, this action can be done automatically each time certain applications process the content for other purposes. For example, a rendering application (such as an MP3 player or MPEG viewer), a compression program, an operating system file management program, or other-purposed software, can calculate the fingerprint from the content, and encode the content with that information (e.g., using header data, or digital watermarking). It does this while the file is being processed for another purpose, e.g., taking advantage of the file's copying into a processing system's RAM memory, from slower storage.

In formats in which content is segregated into portions, such as MP3 frames, a fingerprint can be calculated for, and encoded in association with, each portion. Such fingerprints can later be crosschecked against fingerprint data calculated from the content information, e.g., to confirm delivery of paid-for content. Such fingerprints may be encrypted and locked to the content, as contemplated in application Ser. No. 09/620,019 (U.S. Pat. No. 7,689,532).

In addition, in this frame based systems, the fingerprint data and/or watermark data can be embedded with some or all data throughout each frames. This way a streaming system can use the header to first check the song for identification, and if that identification is absent or not authenticated, the system can check for the watermark and/or calculate the fingerprint. This improves the efficiency and cost of the detecting system.

Before being encrypted and digitally signed, the data in the frame header can be modified by the content, possibly a hash of the content or a few critical bits of content. Thus, the frame header data cannot be transferred between content. When reading the data, it must be modified by the inverse transform of the earlier modification. This system can be applied whether the data is embedded throughout each frame or all in a global file header and is discussed in application Ser. No. 09/404,291 (U.S. Pat. No. 7,055,034). Reading this secure header data is only slightly more complex than without the modification, such that the system is more efficient than always having to calculate the fingerprint and/or detect the watermark.

COLLABORATION

In some situations, content may be processed by plural users, at about the same time, to generate corresponding identifiers. This may occur, for example, where the content is a song or advertisement broadcast over the radio. Many listeners in a metropolitan area may process audio from the same song broadcast over the radio, e.g., to learn the artist or song title, to engage in some related e-commerce activity, or for another purpose (such as the other purposes identified in the cited applications).

In such cases it may be desirable to employ collaboration between such users, e.g., to assure more accurate results, to reduce the processing burden, etc.

In one embodiment, each user generates several different fingerprints from the content (such as those identified in the table, above). These fingerprints may be aggregated with other fingerprints submitted from other users within a given time window (e.g., within the past twenty seconds, or within the past fifteen and next five seconds). Since more data is being considered, the "correct" match may more likely stand out from spurious, incorrect matches.

Consider Users 1 and 2, whose content yields fingerprints giving the following matches (User 1 is unchanged from the earlier example):

| Fingerprinted excerpt | Matches these songs in database |
| --- | --- |
| User 1, Fingerprint N | A, B, C |
| User 1, Fingerprint N + 1 | C, D, E |
| User 1, Fingerprint N + 2 | B, D, F |
| User 1, Fingerprint N + 3 | B, F, G |
| User 2, Fingerprint M | A, B, E |
| User 2, Fingerprint M + 1 | H, I, A |
| User 2, Fingerprint M + 2 | X, Y, Z |

Aggregating the fingerprints from the two users results in an enhanced vote tally in which song B is the evident correct choice—with a higher probability of certainty than in the example earlier given involving a single user:

| | Matches to | | | | | | | | | | |
| --- | --- | --- | --- | --- | --- | --- | --- | --- | --- | --- | --- |
| | A | B | C | D | E | F | G | H | I | X | Y | Z |
| # Hits | 2 | 4 | 2 | 2 | 2 | 2 | 1 | 1 | 1 | 1 | 1 | 1 |

Moreover, note that User 2's results are wholly ambiguous—no song received more than a single candidate match. Only when augmented by consideration of fingerprints from User 1 can a determination for User 2 be made. This collaboration aids the situation where several users are listening to the same content. If two users are listening to different content, it is highly probable that the fingerprints of the two users will be uncorrelated. No benefit arises in this situation, but the collaboration does not work an impairment, either. (In identifying the song for User 1, the system would only check the candidates for whom User 1 voted. Thus, if the above table showed 5 votes for a song J, that large vote count would not be considered in identifying the song for User 1, since none of the fingerprints from User 1 corresponded to that song.)

It will be recognized that the different fingerprints obtained by different users from the same song may be due to a myriad of different factors, such as ambient noise, radio multipath reception, different start times for audio capture, etc.

In the example just given, the number of fingerprints computed for each user can be reduced when compared with non-collaborative approaches, while still providing enhanced confidence in the final song determination.

Another collaborative embodiment employs a reference system. Consider again the example of radio broadcasts in a metropolitan area. Reference receivers can be installed that continuously receive audio from each of several different radio stations. Instead of relying on sound picked up by a microphone from an ambient setting, the reference receivers can generate fingerprint data from the audio in electronic form (e.g., the fingerprint-generation system can be wired to the audio output of the receiver). Without the distortion inherent in rendering through a loudspeaker, sensing through a microphone, and ambient noise effects, more accurate fingerprints may be obtained.

The reference fingerprints can be applied to the database to identify—in essentially real-time and with a high degree of certainty—the songs (or other audio signals) being broadcast by each station. The database can include a set of fingerprints associated with the song. Alternatively, the reference receiver can generate fingerprints corresponding to the identified song.

Consumers listen to audio, and fingerprints are generated therefrom, as before. However, instead of applying the consumer-audio fingerprints to the database (which may involve matching to one of hundreds of thousands of possible songs), the consumer fingerprints are instead compared to the fingerprints generated by the reference receivers (or songs determined there from). The number of such reference fingerprints will be relatively low, related to the number of broadcast stations being monitored. If a consumer-audio fingerprint correlates well with one of the reference fingerprints, then the song corresponding to that reference fingerprint is identified as the song to which the consumer is listening. If the consumer-audio fingerprint does not correlate well with any of the reference fingerprints, then the system may determine that the audio heard by the consumer is not in the subset monitored by the reference receivers, and the consumer-audio fingerprints can thereafter be processed against the full fingerprint database, as earlier described.

The system just described is well suited for applications in which the geographical location of the consumer is known, or can be inferred. For example, if the consumer device that is listening to the audio is a cell phone, and the cellular wireless infrastructure is used to relay data with the phone, the cell system can determine whether the geographical location of the listener (e.g., by area code, cell site, etc.). (Use of such cell-system data to help geographically locate the user can be employed advantageously in several such song-identification systems.).

Even if the consumer's location cannot be determined, the number of songs playing on radio stations nationwide is still a small subset of the total number of possible songs. So a nationwide system, with monitoring stations in many metropolitan areas, can be used to advantage.

As an optional enhancement to such a collaborative system, broadcast signals (e.g., audio signals) are digitally watermarked. The digital watermark preferably contains plural-bit data, which is used to identify the audio signal (e.g., a set of audio fingerprints from the audio signal, song title, copyright, album, artist, and/or record label, etc., etc.). The plural-bit data can either directly or indirectly identify the audio signal. In the indirect case, the plural-bit data includes a unique identifier, which can be used to interrogate a database. The database preferably includes some or all of the identifying information mentioned above. A reference receiver decodes an embedded digital watermark from a received audio signal. The unique identifier is used to interrogate the database to identify a fingerprint or a set of fingerprints associated with the particular audio signal. In some cases, the set includes one fingerprint; in other cases, the set includes a plurality of fingerprints. On the user side, fingerprints are generated and relayed to the reference receiver (or associated interface). The user's fingerprints are then compared against the reference fingerprints, as discussed above in the earlier embodiments.

The foregoing are just exemplary implementations of the present invention. It will be recognized that there are a great number of variations on these basic themes. The foregoing illustrates but a few applications of the detailed technology. There are many others.

To provide a comprehensive disclosure without unduly lengthening this specification, applicants incorporate by reference the patents and patent applications cited above. It is applicant's express intention to teach that the methods detailed herein are applicable in connection with the technologies and applications detailed in these cited patents and applications.

Although the foregoing specification has focused on audio applications, it will be recognized that the same principles are likewise applicable with other forms of content, including still imagery, motion pictures, video, etc. References to "songs" are illustrative only, and are not intended to limit the present invention. The inventive methods and systems could also be applied other audio, image, video signals as well. Also, for example, Digimarc MediaBridge linking from objects to corresponding internet resources can be based on identifiers derived from captured image data or the like, rather than from embedded watermarks. As such, the technique is applicable to images and video.

We claim:

1. A method comprising:
   obtaining, using a processor, a first fingerprint comprising a first reduced-bit representation of an item of content;
   obtaining a second fingerprint comprising a second, different reduced-bit representation of the item of content; and
   identifying, from a database, information associated with the item of content utilizing both the first fingerprint and the second fingerprint, wherein the first fingerprint or the second fingerprint is derived from transform domain coefficients after transformation of the item of content into a transform domain.

2. The method of claim 1, wherein the transformation utilizes a discrete cosine transform (DCT).

3. A non-transitory computer readable medium having instructions stored thereon that, if executed by a computing device, cause the computing device to perform operations comprising:
   obtaining a first fingerprint comprising a first reduced-bit representation of an item of content;
   obtaining a second fingerprint comprising a second, different reduced-bit representation of the item of content; and
   identifying, from a database, information associated with the item of content utilizing both the first fingerprint and the second fingerprint, wherein the first fingerprint or the second fingerprint is derived from transform domain coefficients after transformation of the item of content into a transform domain.

4. A method comprising:
   obtaining content;
   searching, using a processor, a header associated with the content to obtain an identifier derived from the content itself;
   only if an identifier is not found, computing a fingerprint from the content itself, wherein the fingerprint comprises a reduced-bit representation of the content;
   modifying the computed fingerprint based upon the content; and
   embedding the computed fingerprint in the header.

5. A method comprising:
   obtaining content segregated into portions corresponding to compression;
   calculating, using a processor, two or more fingerprints, wherein each fingerprint respectively corresponds to a different portion of the content;
   storing the two or more fingerprints in a data structure for identification of the content; and
   embedding each fingerprint in its respective portion of the content with digital watermarking.

6. The method of claim 5, wherein the two or more fingerprints stored in the data structure are each associated with its particular portion of the content.

7. The method of claim 5, wherein the content comprises at least audio or video.

8. A method comprising:
   obtaining at least one fingerprint from a mobile user device, wherein the at least one fingerprint is derived from a received signal representing at least a portion of a broadcast or rendered signal;
obtaining geographical location information associated with the mobile user device;
determining a set of fingerprints based on the geographical location information; and
determining, using a processor, one or more fingerprints from the set of fingerprints based on the at least one fingerprint, wherein the one or more fingerprints are associated with the broadcast or rendered signal.

9. The method of claim 8, wherein the one or more fingerprints determined from the set of fingerprints correspond to one or more content items.

10. The method of claim 9, wherein the one or more content items comprise at least audio or video.

11. The method of claim 8, wherein the mobile user device comprises a cellular phone.

12. A non-transitory computer readable medium having instructions stored thereon that, if executed by a computing device, cause the computing device to perform operations comprising:
obtaining at least one fingerprint from a mobile user device, wherein the at least one fingerprint is derived from a received signal representing at least a portion of a broadcast or rendered signal;
obtaining geographical location information associated with the mobile user device;
determining a set of fingerprints based on the geographical location information; and
determining one or more fingerprints from the set of fingerprints based on the at least one fingerprint, wherein the one or more fingerprints are associated with the broadcast or the rendered signal.

13. The non-transitory computer readable medium of claim 12, wherein the one or more fingerprints determined from the set of fingerprints correspond to one or more content items, and wherein the one or more content items comprise at least audio or video.

14. A method comprising:
transforming each of plural audio content to another domain, yielding transformed data;
deriving plural fingerprint data from the transformed data, wherein the plural audio content represents audio data received from plural radio broadcasts;
by reference to the fingerprint data, obtaining related data, wherein the related data includes data identifying plural different items of audio data as they are being broadcast on several of said radio broadcasts; and
referring to at least some of the foregoing data to simplify identification of audio captured by a cell phone.

15. The method of claim 14, further comprising:
deriving fingerprint data from audio captured by a cell phone;
checking a first database of fingerprint data corresponding to items of audio data identified from the radio broadcasts; and
if that check fails to identify the audio captured by the user's cell phone, checking a second, larger database of fingerprint data, wherein the second database includes fingerprint data corresponding to other items of audio data.

16. A method comprising:
generating, using a processor, first fingerprint data from a previously received signal representing at least a portion of a broadcast or rendered signal;
applying the first fingerprint data to a database to select associated information;
receiving second fingerprint data; and
comparing the second fingerprint data with the associated information, wherein the comparing comprises selecting a subset from the associated information based on a vote tally, wherein the vote tally includes probabilities of a match with the second fingerprint data, and wherein the selected subset has a highest probability of a match.

17. A method comprising:
generating first fingerprint data from a previously received signal representing at least a portion of a broadcast or rendered signal;
applying the first fingerprint data to a database to select associated information;
receiving second fingerprint data generated with a programmed user device;
comparing the second fingerprint data with the associated information; and
determining a geographical location of the programmed user device, wherein the geographical location is used at least in part to identify a broadcast or rendered signal.

18. The method according to claim 17, wherein the programmed user device comprises a cell phone, and wherein the geographical location of the cell phone is determined by at least one of area code, cell site, device identifier, repeater identifier, or alpha-numeric data.

19. A method comprising:
generating, using a processor, first fingerprint data from a previously received first signal representing at least a portion of a broadcast or rendered signal;
applying the first fingerprint data to a database to select associated information;
receiving second fingerprint data;
comparing the second fingerprint data with the associated information;
generating third fingerprint data from a previously received second signal representing at least a portion of a broadcast or rendered signal; and
applying the third fingerprint data to the database to select associated information.

20. A device comprising:
a processor configured to:
transform each of plural audio content to another domain, yielding transformed data;
derive plural fingerprint data from the transformed data, wherein the plural audio content represents audio data received from plural radio broadcasts;
by reference to the fingerprint data, obtain related data, wherein the related data includes data identifying plural different items of audio data as they are being broadcast on several of said radio broadcasts; and
refer to at least some of the foregoing data to simplify identification of audio captured by a cell phone.

21. A non-transitory computer readable medium having instructions stored thereon that, if executed by a computing device, cause the computing device to perform operations comprising:
transforming each of plural audio content to another domain, yielding transformed data;
deriving plural fingerprint data from the transformed data, wherein the plural audio content represents audio data received from plural radio broadcasts;
by reference to the fingerprint data, obtaining related data, wherein the related data includes data identifying plural different items of audio data as they are being broadcast on several of said radio broadcasts; and
referring to at least some of the foregoing data to simplify identification of audio captured by a cell phone.

22. A device comprising:
a processor configured to:
generate first fingerprint data from a previously received signal representing at least a portion of a broadcast signal;
apply the first fingerprint data to a database to select associated information;
receive second fingerprint data; and
compare the second fingerprint data with the associated information, wherein the comparing comprises selecting a subset from the associated information based on a vote tally.

23. A non-transitory computer readable medium having instructions stored thereon that, if executed by a computing device, cause the computing device to perform operations comprising:
generating first fingerprint data from a previously received signal representing at least a portion of a broadcast signal;
applying the first fingerprint data to a database to select associated information;
receiving second fingerprint data; and
comparing the second fingerprint data with the associated information, wherein the comparing comprises selecting a subset from the associated information based on a vote tally.

24. A device comprising:
a processor configured to:
generate first fingerprint data from a previously received signal representing at least a portion of a broadcast or rendered signal;
apply the first fingerprint data to a database to select associated information;
receive second fingerprint data; and
compare the second fingerprint data with the associated information, wherein the comparing comprises selecting a subset from the associated information based on a vote tally, wherein the vote tally includes probabilities of a match with the second fingerprint data, and wherein the selected subset has a highest probability of a match.

25. A non-transitory computer readable medium having instructions stored thereon that, if executed by a computing device, cause the computing device to perform operations comprising:
generating first fingerprint data from a previously received signal representing at least a portion of a broadcast or rendered signal;
applying the first fingerprint data to a database to select associated information;
receiving second fingerprint data; and
comparing the second fingerprint data with the associated information, wherein the comparing comprises selecting a subset from the associated information based on a vote tally, wherein the vote tally includes probabilities of a match with the second fingerprint data, and wherein the selected subset has a highest probability of a match.

26. A device comprising:
a processor configured to:
generate first fingerprint data from a previously received first signal representing at least a portion of a broadcast or rendered signal;
apply the first fingerprint data to a database to select associated information;
receive second fingerprint data;
compare the second fingerprint data with the associated information;
generate third fingerprint data from a previously received second signal representing at least a portion of a broadcast or rendered signal; and
apply the third fingerprint data to the database to select associated information.

27. A non-transitory computer readable medium having instructions stored thereon that, if executed by a computing device, cause the computing device to perform operations comprising:
generating first fingerprint data from a previously received first signal representing at least a portion of a broadcast or rendered signal;
applying the first fingerprint data to a database to select associated information;
receiving second fingerprint data;
comparing the second fingerprint data with the associated information;
generating third fingerprint data from a previously received second signal representing at least a portion of a broadcast or rendered signal; and
applying the third fingerprint data to the database to select associated information.

28. A device comprising:
a processor configured to:
obtain at least one fingerprint from a mobile user device, wherein the at least one fingerprint is derived from a received signal representing at least a portion of a broadcast or rendered signal;
obtain geographical location information associated with the mobile user device;
determine a set of fingerprints based on the geographical location information; and
determine one or more fingerprints from the set of fingerprints based on the at least one fingerprint, wherein the one or more fingerprints are associated with the broadcast or the rendered signal.

29. A device comprising:
a processor configured to:
obtain content;
search a header associated with the content to obtain an identifier derived from the content itself;
only if an identifier is not found, compute a fingerprint from the content itself, wherein the fingerprint comprises a reduced-bit representation of the content;
modify the computed fingerprint based upon the content; and
embed the computed fingerprint in the header.

30. A non-transitory computer readable medium having instructions stored thereon that, if executed by a computing device, cause the computing device to perform operations comprising:
obtaining content;
searching a header associated with the content to obtain an identifier derived from the content itself;
only if an identifier is not found, computing a fingerprint from the content itself, wherein the fingerprint comprises a reduced-bit representation of the content;
modifying the computed fingerprint based upon the content; and
embedding the computed fingerprint in the header.

31. A method comprising:
deriving fingerprint information corresponding to audio or video using a mobile user device;
obtaining geographical location information associated with the mobile user device;

communicating the fingerprint information and the geographical location information to a remotely located network service; and receiving a response from the remotely located service, wherein the content of the response is dependent on both the fingerprint information and the geographical location information.

32. A device comprising:

a processor configured to:

derive fingerprint information corresponding to audio or video using a mobile user device;

obtain geographical location information associated with the mobile user device;

communicate the fingerprint information and the geographical location information to a remotely located network service; and receive a response from the remotely located service, wherein the content of the response is dependent on both the fingerprint information and the geographical location information.

33. A non-transitory computer readable medium having instructions stored thereon that, if executed by a computing device, cause the computing device to perform operations comprising:

deriving fingerprint information corresponding to audio or video using a mobile user device;

obtaining geographical location information associated with the mobile user device;

communicating the fingerprint information and the geographical location information to a remotely located network service; and receiving a response from the remotely located service, wherein the content of the response is dependent on both the fingerprint information and the geographical location information.

34. A non-transitory computer readable medium having instructions stored thereon, that, if executed by a computing device, cause the computing device to perform operations comprising:

obtaining content segregated into portions corresponding to compression;

calculating two or more fingerprints, wherein each fingerprint respectively corresponds to a different portion of the content;

storing the two or more fingerprints in a data structure for identification of the content; and embedding each fingerprint in its respective portion of the content with digital watermarking.

35. A device comprising:

a processor configured to:

obtain a first fingerprint comprising a first reduced-bit representation of an item of content;

obtain a second fingerprint comprising a second, different reduced-bit representation of the item of content; and identify, from a database, information associated with the item of content utilizing both the first fingerprint and the second fingerprint, wherein the first fingerprint or the second fingerprint is derived from transform domain coefficients after transformation of the item of content into a transform domain.

36. An apparatus comprising:

a processor configured to:

obtain content segregated into portions corresponding to compression;

calculate two or more fingerprints, wherein each fingerprint respectively corresponds to a different portion of the content;

store the two or more fingerprints in a data structure for identification of the content; and embed each fingerprint in its respective portion of the content with digital watermarking.

37. A non-transitory computer readable medium having instructions stored thereon that, if executed by a computing device, cause the computing device to perform operations comprising:

generating first fingerprint data from a previously received signal representing at least a portion of a broadcast or rendered signal;

applying the first fingerprint data to a database to select associated information;

receiving second fingerprint data generated with a programmed user device;

comparing the second fingerprint data with the associated information; and determining a geographical location of the programmed user device, wherein the geographical location is used at least in part to identify a broadcast or rendered signal.

38. A device comprising:

a processor configured to:

generate first fingerprint data from a previously received signal representing at least a portion of a broadcast or rendered signal;

apply the first fingerprint data to a database to select associated information;

receive second fingerprint data generated with a programmed user device;

compare the second fingerprint data with the associated information; and determine a geographical location of the programmed user device, wherein the geographical location is used at least in part to identify a broadcast or rendered signal.

* * * * *

UNITED STATES PATENT AND TRADEMARK OFFICE
CERTIFICATE OF CORRECTION

PATENT NO. : 8,095,796 B2  Page 1 of 1
APPLICATION NO. : 11/945859
DATED : January 10, 2012
INVENTOR(S) : Conwell et al.

It is certified that error appears in the above-identified patent and that said Letters Patent is hereby corrected as shown below:

Column 1, line 27, delete "Oct. 6, 1999." and insert -- Oct. 6, 1999, --.

Signed and Sealed this
Twelfth Day of June, 2012

David J. Kappos
*Director of the United States Patent and Trademark Office*